United States Patent
Houde-Walter et al.

(10) Patent No.: US 9,851,578 B2
(45) Date of Patent: Dec. 26, 2017

(54) ADAPTIVE PARTICLE PROJECTION PATH INDICATOR

(71) Applicant: LaserMax, Inc., Rochester, NY (US)

(72) Inventors: William Houde-Walter, Rush, NY (US); Christopher A. Gagliano, Rochester, NY (US)

(73) Assignee: Lasermax Inc, Rochester, NY (US)

( * ) Notice: Subject to any disclaimer, the term of this patent is extended or adjusted under 35 U.S.C. 154(b) by 102 days.

(21) Appl. No.: 15/004,363

(22) Filed: Jan. 22, 2016

(65) Prior Publication Data

US 2016/0216526 A1 Jul. 28, 2016

Related U.S. Application Data

(60) Provisional application No. 62/107,069, filed on Jan. 23, 2015.

(51) Int. Cl.
| | |
|---|---|
| *G02B 23/10* | (2006.01) |
| *G02B 27/36* | (2006.01) |
| *G02B 27/34* | (2006.01) |
| *F41G 1/30* | (2006.01) |

(52) U.S. Cl.
CPC ............... *G02B 27/36* (2013.01); *F41G 1/30* (2013.01); *G02B 27/34* (2013.01); *G05B 2219/32014* (2013.01)

(58) Field of Classification Search
CPC ........... G02B 27/36; G02B 23/14; F41G 1/30; G05B 2219/32014
See application file for complete search history.

(56) References Cited

U.S. PATENT DOCUMENTS

| | | | | |
|---|---|---|---|---|
| 6,025,908 A | * | 2/2000 | Houde-Walter | ....... G01B 11/26 356/153 |
| 2013/0279013 A1 | * | 10/2013 | Edwards | ........... G02B 27/0189 359/630 |

* cited by examiner

*Primary Examiner* — Michael A Lyons
*Assistant Examiner* — Maurice Smith
(74) *Attorney, Agent, or Firm* — Lee & Hayes, PLLC

(57) ABSTRACT

Aiming systems are provided for use with a particle projection device. Such aiming systems may have a housing mountable to the particle projection device for movement therewith, a window defining a field of view when in a first orientation and a second field of view when in a second orientation. A first reticle image is visible in the window when the housing and particle projection device are at the first orientation with the first reticle image representative of a projection path of the particles in the first field of view. A second reticle image is visible in the window when the housing and particle projection device are at the second orientation with the second reticle image being representative of a projection path of the particles in the second field of view.

13 Claims, 8 Drawing Sheets

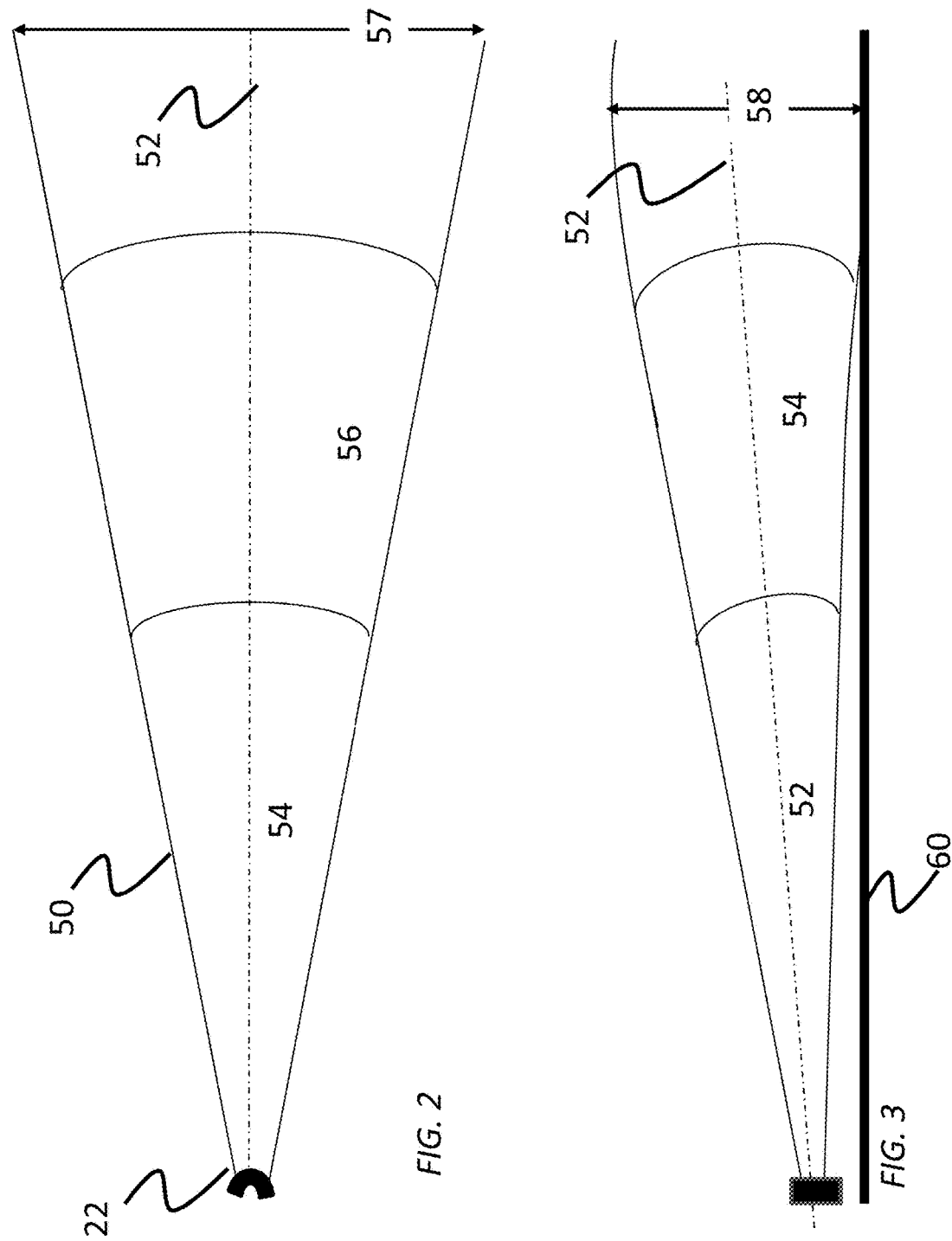

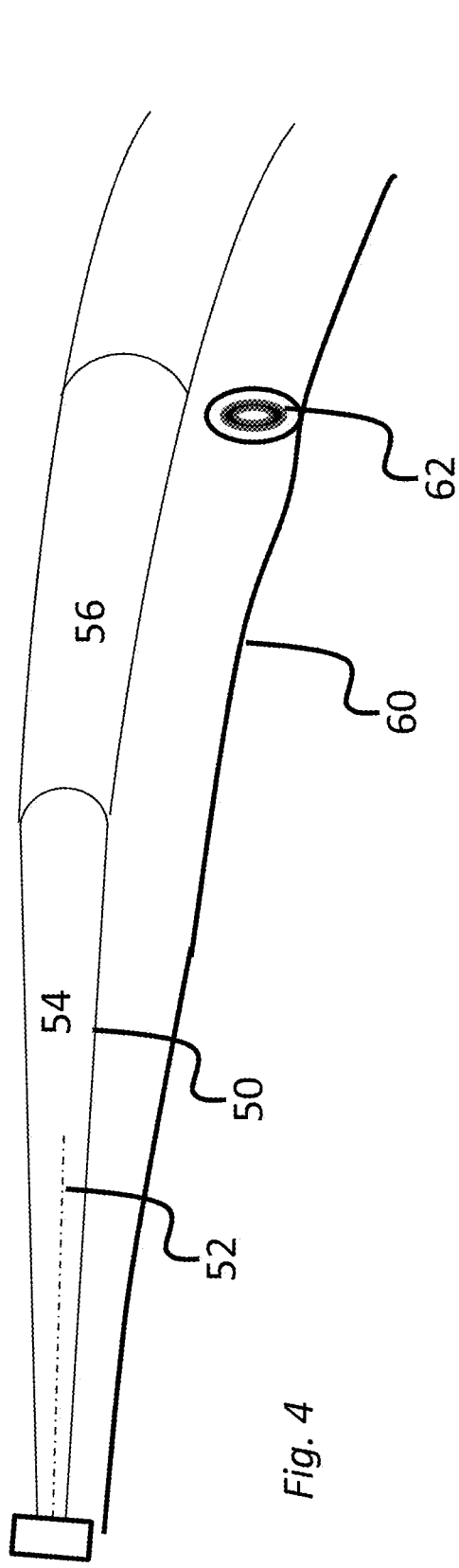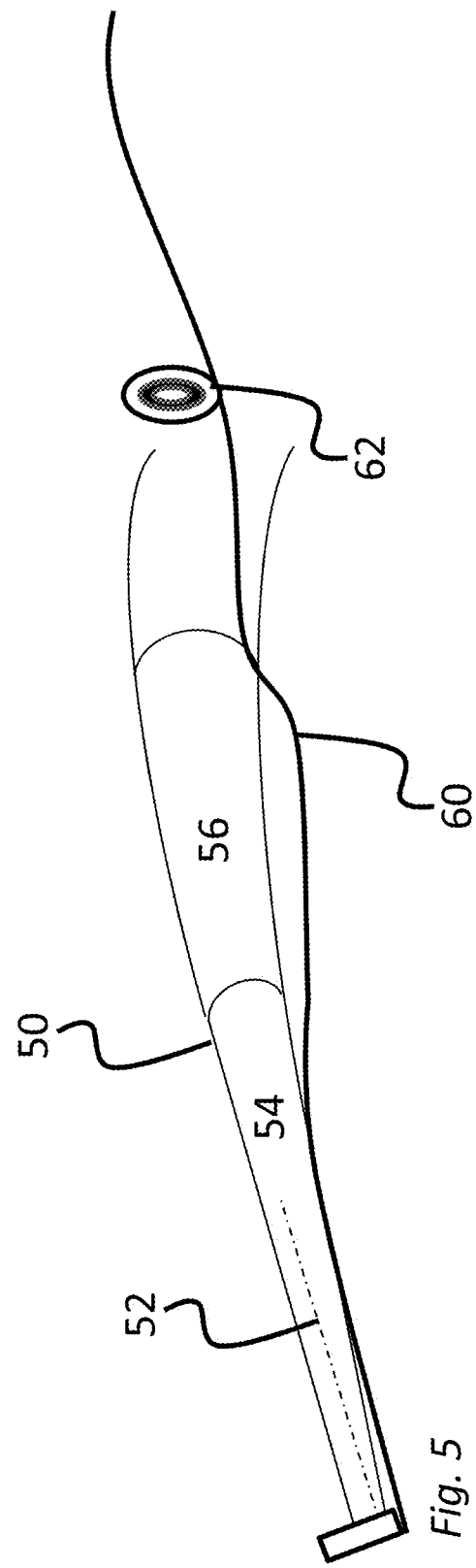

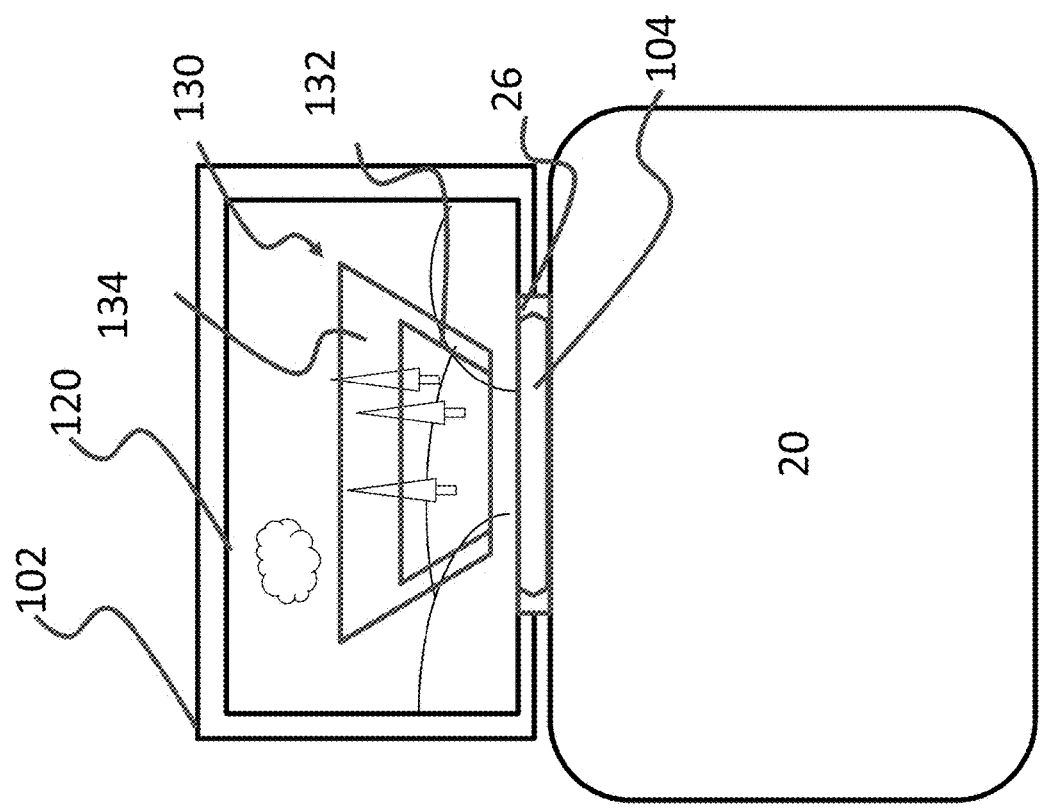
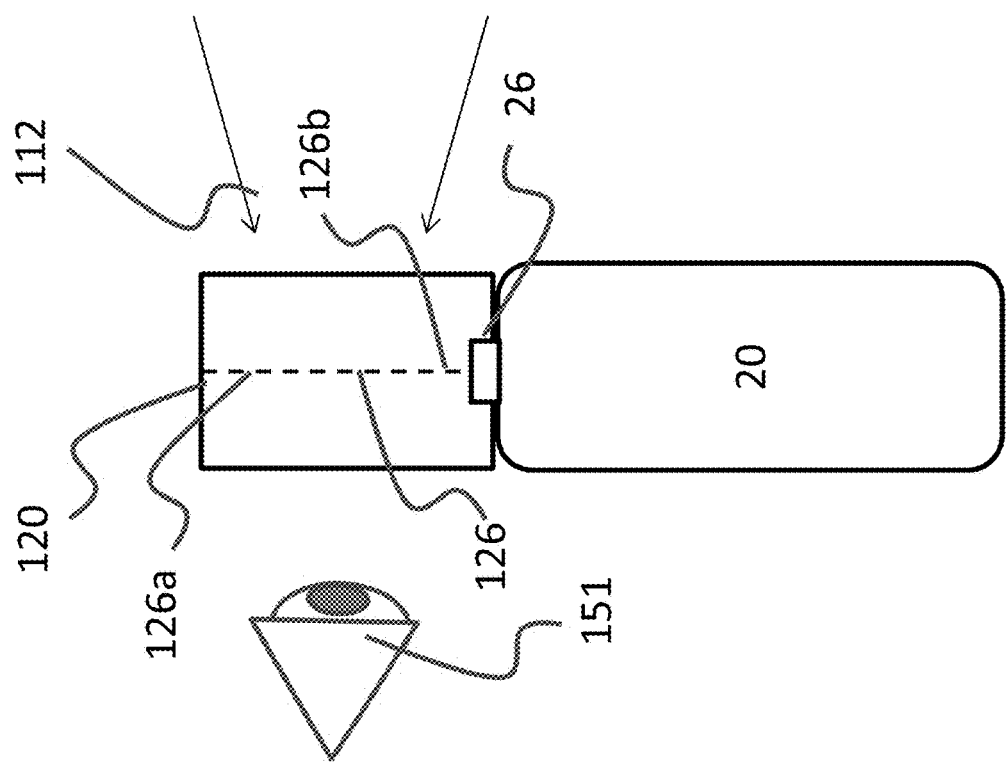
FIG. 6B
FIG. 6A

ADAPTIVE PARTICLE PROJECTION PATH INDICATOR

CROSS-REFERENCE TO RELATED APPLICATIONS

This application claims the benefit of U.S. Provisional Application No. 62/107,069 filed Jan. 23, 2015.

STATEMENT REGARDING FEDERALLY SPONSORED RESEARCH OR DEVELOPMENT

N/A

BACKGROUND OF THE INVENTION

Particle projection devices such as anti-personnel mines or recreational variants of the same used, for example, in paintball or the like project objects from a container into a three dimensional space. In general such objects are projected along a generally conical path that expands as the objects travel away from the projection device. However, the exact path of each projectile can be a function of many factors. Some of these factors are related to the placement, direction and orientation of the projection device and can be controlled by the person installing the particle projection device while others may not be—such as the presence or absence of surrounding terrain features, sloping ground in the area of projection wind resistance, weather conditions and the like.

The challenge facing an installer of a particle projection device is to install such a projection device in a manner that optimizes the potential impact of particles projecting through the three dimensional space of the environment available and it can be difficult for installers to anticipate the effects that some of these conditions may have on the projection space that particles will project into.

What are needed therefore are methods and systems that allow a user to install a particle projection device in a manner that projects particles into a desired area.

SUMMARY OF THE INVENTION

Aiming systems are provided for use with a particle projection device. Such aiming systems may have a housing mountable to the particle projection device for movement therewith, a window defining a field of view when in a first orientation and a second field of view when in a second orientation. A first reticle image is visible in the window when the housing and particle projection device are at the first orientation with the first reticle image representative of a projection path of the particles in the first field of view. A second reticle image is visible in the window when the housing and particle projection device are at the second orientation with the second reticle image being representative of a projection path of the particles in the second field of view.

BRIEF DESCRIPTION OF THE DRAWINGS

FIGS. 2 and 3 illustrate respectively top and side views of a projection path that is generally along an axis.

FIG. 4 illustrates a projection path along a projection axis that follows terrain that has a downward grade.

FIG. 5 illustrates a projection path along a projection axis that follows terrain that has an upward grade.

FIGS. 6A and 6B respectively show side and rear views of an aiming system associated with a particle projection device in a generally level orientation.

DETAILED DESCRIPTION OF THE INVENTION

Figure 1:
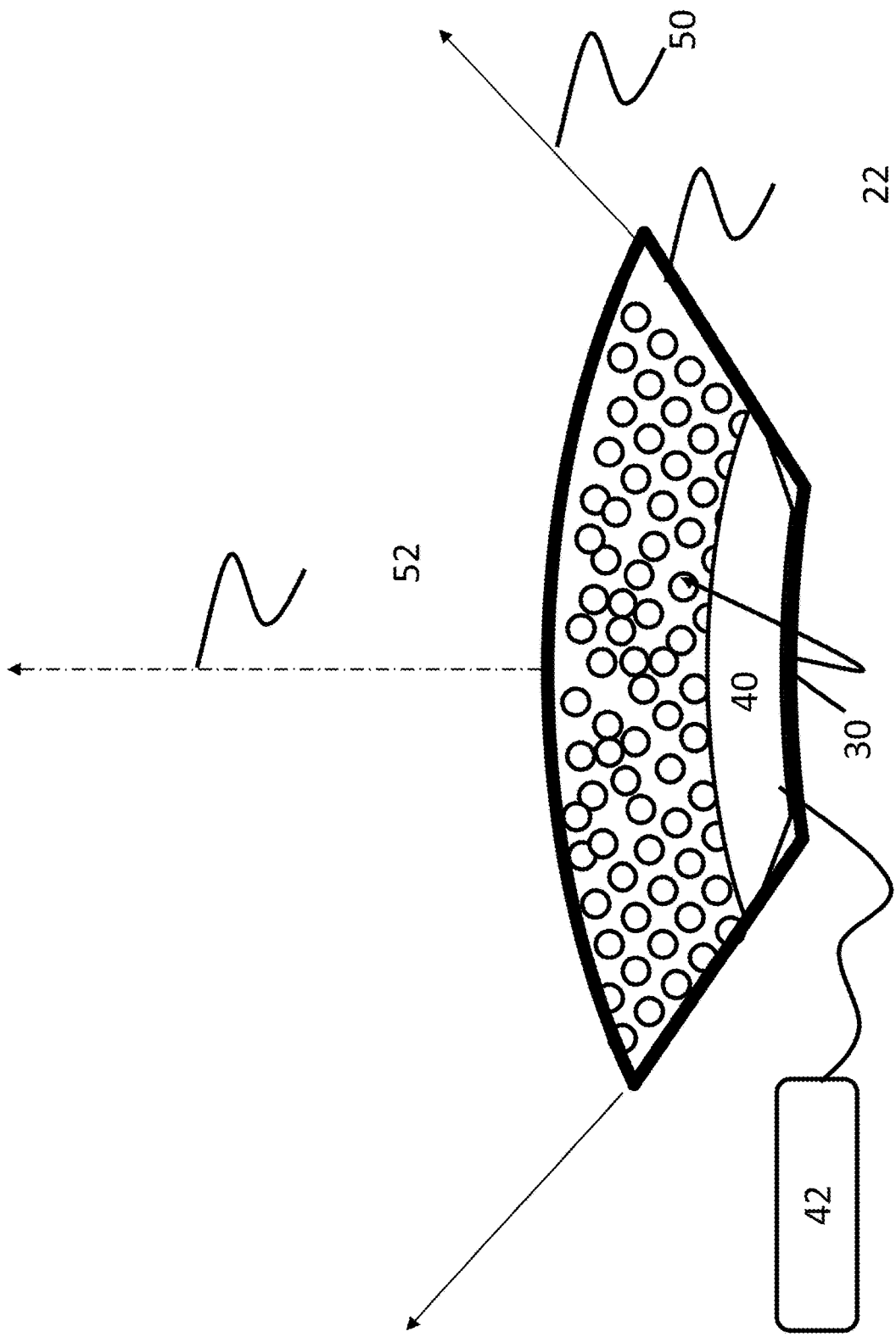
FIG. 1 illustrates an example of a particle projection device.

FIG. 1 illustrates an example of a particle projection device 20 having an exterior housing 22 that contains a plurality of projectiles 30, a projectile accelerator 40 and a detonator 42. When detonator 42 is activated projectile accelerator 40 blasts projectiles 30 along a projection path 50 having a projection axis 52. In one example, projectile launcher 20 may be an M18 type "Claymore" mine that uses an explosive type projectile accelerator 40 to blast projectiles 30 in the form of ball bearings or other small projectiles into a projection path. In another example projectile accelerator 40 may be an air pressure or mechanical launcher for blasting airsoft, paintball, pepper ball, or other objects intended for non-lethal recreational, crowd control or other purposes.

FIGS. 2 and 3 illustrate respectively top and side views of a projection path 50 that is generally along an axis 52. As is clear from FIGS. 2 and 3 projection path 50 conventionally expands outwardly in three dimensional space with to a lateral extent 57 and a vertical extent 58. As this happens, projectiles (not shown in FIGS. 2 and 3) are spread over increasingly large area. In a first zone 54 of projection path 50 most proximate to high velocity launcher 20, a density of projectiles is at a level that makes it highly probable that a person or other object in the projection path will be struck by one or more of the projectiles. However, as projection path 50 continues to expand, the density of projectiles per unit area decreases creating a second zone 56 of blast path 50 where it is no longer highly probable that a person or other object in the projection path will be impacted by a projectile.

It will be appreciated that this distinction between first zone 54 of projection path 50 and second zone 56 of projection path 50 is a construct that is provided here for illustrative purposes and that that it is possible for there to be many other ranges and ways to separate such ranges. For example, a third portion of projection path 50 may exist where a possibility of such impact exists but the possibility is much less likely than in the first or second portion of the projection path 50.

The path that projectiles emitted by a projectile launcher 20 will follow is influenced by three main factors, the launch velocity of the projectiles, the extent to which the projectiles are slowed by air resistance and gravity which ultimately pulls such projectiles to the ground. In cases where large balls of pepper are projected at a relatively low velocity, air resistance will quickly decelerate the projectiles allowing gravity to shorten the range over which they travel. In cases where small projectiles like ball bearings are accelerated by explosives such projectiles may travel considerable distances before falling to ground 60. As is shown in FIG. 3, such projectiles may reach a peak vertical extent 59 after which such projectiles and projection path 50 begins to reduce in vertical extent 58.

An additional factor that will influence projection path 50 of the projectiles is whether the projection device is tilted upward or downward against gravity and topography along the projection path. For example, in FIG. 4 although projection axis 52 projection path 50 is slightly downward, ground 60 drops away in the direction of projection 50 therefore gravity will take longer to bring the projectiles into the ground extending the range and also making it possible that the projectiles will substantially overshoot a target 62.

In contrast, as is shown in FIG. 5, what is shown is a projection path 50 having a projection axis 52 that is aimed upward against gravity. In such a path, gravity and air resistance exert a combined effect on the projectiles slowing their speed and reducing the effective range of the high velocity launcher 20 such that first zone 54 and second zone 56 are closer to launcher 20 possibly moving target 62 outside of first zone 54 and second zone 56. It will be appreciated that in this case, the lateral extent of spread of projection path 50 may also be constrained.

Conventional aiming solutions for such devices include viewfinders, peep hole sights and knife sights which center the device laterally but do little to help the person using the device to fully understand the consequences of aiming decisions, including the effect of tilt and the extent of the spread of the projectiles at any range.

What is needed in the art therefore is a new aiming solution that automatically provides an indication of a path for projectiles that adapt to the orientation of the device.

FIGS. 6A and 6B illustrate side and rear elevation views of a first embodiment of an aiming device 100 for a particle projection device 20. As is shown in the embodiment of FIGS. 6A and 6B aiming device 100 has a frame 102 that is mechanically linked to housing 22 to provide lateral alignment with a projection axis of the projection path. In the embodiment illustrated in FIGS. 6A and 6B, frame 102 is linked to housing 22 by way of a mounting 104 that is co-designed to work with a mounting 26 on housing 22. Any known configuration of mounting structures or systems can be used for this purpose including rails such as the Picatinny Rail, clamp structures and the like. In this embodiment, aiming device 100 can be mounted to a first particle projection device 20, used to aim particle projection device 20 and then removed and used with to aim another particle projection device 20.

In the embodiment of FIGS. 6A and 6B, aiming device 100 has aiming window 110 through which light 112 that reflects from a field of view 120 that is sized to include a projection path 50 for projectiles 30. Aiming window 110 includes a hologram 126 providing a first holographic image 130 within field of view 120 when field of view 120 is observed by an eye 151 of a user through window 110. Hologram 126 is linked for pivotal or bending movement relative to window 110 at a top end 126a and a bottom end 126b can move freely. Aiming device 100 is configured so that when particle projection device 20 is aimed within a range of tilt positions relative to the horizontal, a user looking through window 110 will see the first holographic image 130.

Alternatively, frame 102 can be mounted to housing 22 directly such as by way of fasteners, adhesives, magnetics or other known technologies for binding devices or formed integrally with frame 102.

Figures 7A, 7B:
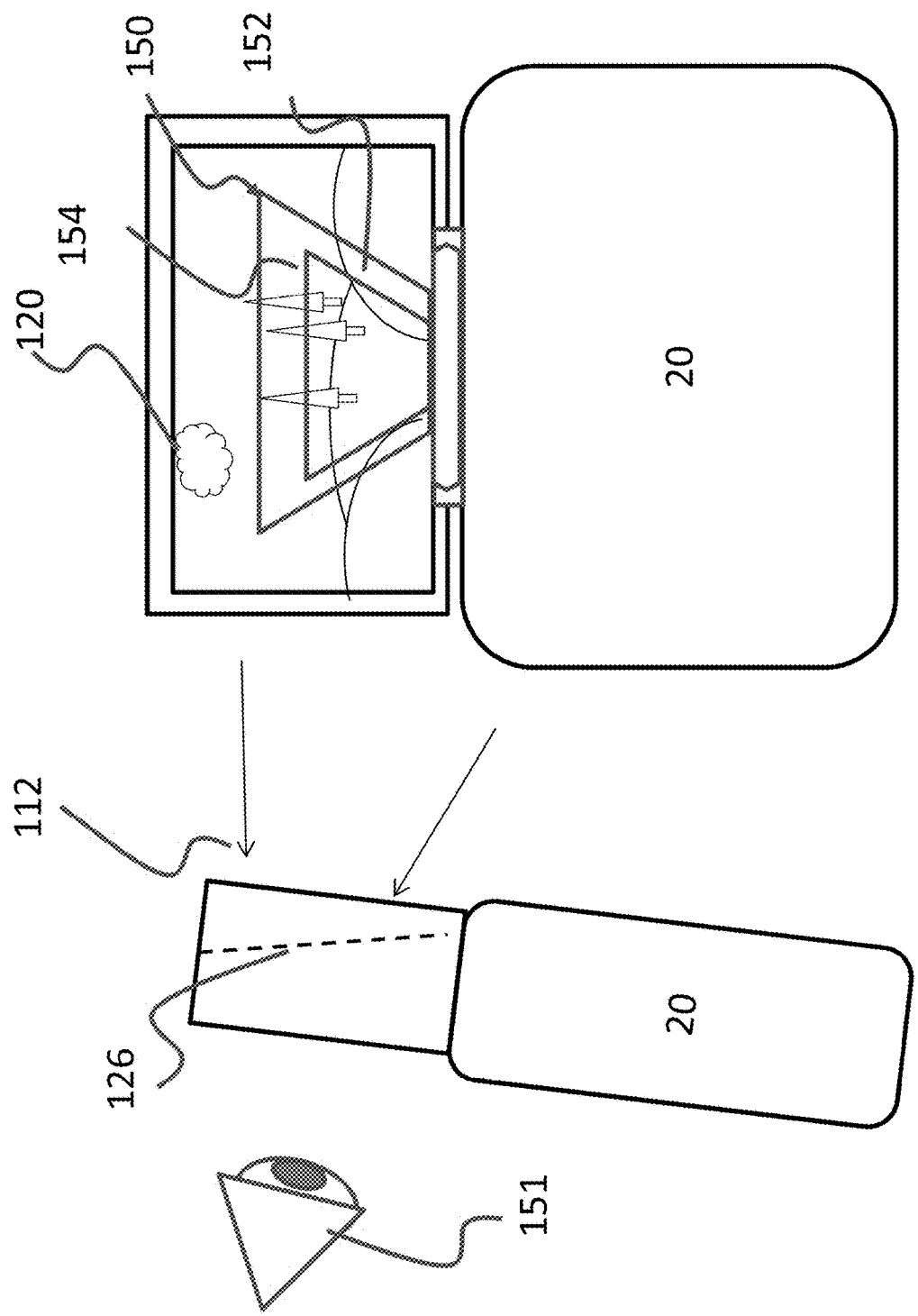
FIGS. 7A and 7B respectively show side and rear views of the aiming system and particle projection device of FIGS. 6A and 6B in tilted at least in part downwardly.

However, as is shown in FIGS. 7A and 7B when a user configures the projection device so that projection axis 52 is at a generally downward angle, the eye 151 of the user looks through window 110 from generally the same set of viewing angles as illustrated in FIGS. 6A and 6B, but sees hologram 126 from a different range of viewing angles as hologram 126 will seek to remain vertical despite tilting of window 110 and particle projection device 20. Accordingly, the user sees hologram 126 from a different range of viewing angles when window 110 and particle projection device 20 are tilted downwardly that the user sees when hologram 126 is being viewed from the first range of viewing angles.

In this embodiment, hologram 126 presents a second holographic image 160 when a user observes hologram 126 from a second range of viewing angles such as occurs when aiming device 100 and particle projection device 20 are tilted downwardly as is illustrated in FIGS. 7A and 7B.

In this embodiment, hologram 126 is created so that a second image 150 having reticles 152 and 154 appears in window 110 and is visible to an eye of a user when the user views hologram 126 from the second range of viewing angles. As is shown in FIG. 7B, reticles 152 and 154 are larger than reticles 132 and 134 shown in FIG. 6B, respectively reflecting the increased range made possible by not sacrificing kinetic energy in resisting gravity. It is noted that terrain will of course determine whether the projected projectiles will have the desired effect, in that projectiles that strike earth or other downward objects will not be available to strike a preferred target.

Figures 8A, 8B:
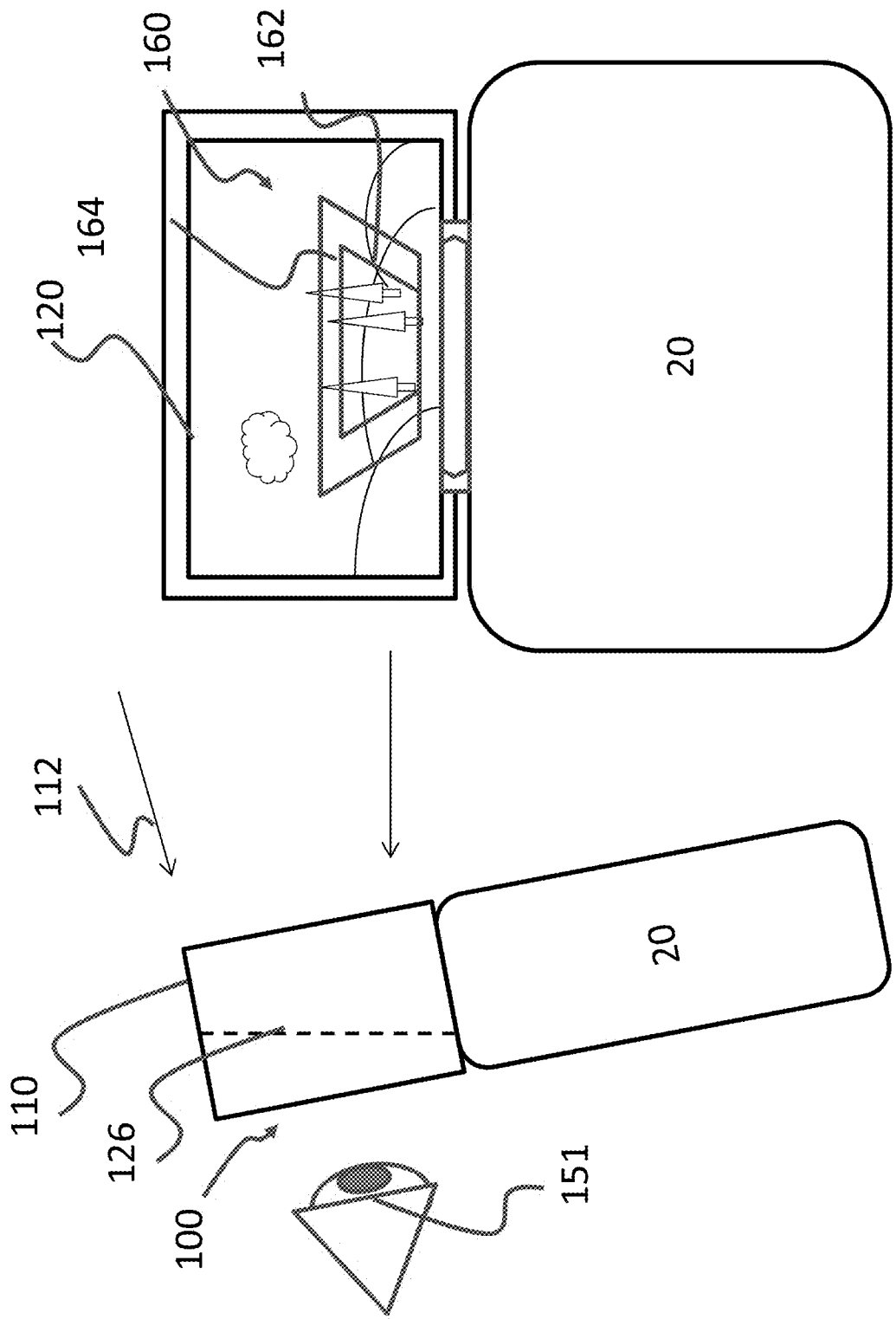
FIGS. 8A and 8B respectively show side and rear views of the aiming system and particle projection device of FIGS. 6A and 6B in tilted at least in part upwardly.

Similarly, as is shown in FIGS. 8A and 8B when a user configures aiming device 100 and projection device 20 such that projection axis 52 is generally at an upward angle generally downward angle, eye 151 of the user looks through window 110 from generally the same set of viewing angles as illustrated in FIG. 6A, but sees hologram 126 from a third range of viewing angles as hologram 126 will seek to remain vertical despite upward tilting of window 110 and particle projection device 20. Accordingly, the user sees hologram 126 from a different range of viewing angles when window 110 and particle projection device 20 are tilted upwardly than the user sees when hologram 126 is being viewed from the first range of viewing angles or the second range of viewing angles.

In this embodiment, hologram 126 presents a third holographic image 160 when a user observes hologram 126 from the third range of viewing angles such as occurs when aiming device 100 and particle projection device 20 are tilted upwardly as is illustrated in FIGS. 8A and 8B. That is, in this embodiment, hologram 126 is created so that a third image 160 having reticles 162 and 164 appears in window 110 and is visible to an eye 151 of a user when the user views hologram 126 from the third range of viewing angles. As is shown in FIG. 8B, reticles 162 and 164 are smaller than reticles 132 and 134 respectively reflecting the decreased range made possible by sacrificing kinetic energy in resisting gravity and the possibility of overshooting a portion of the field. It is noted that terrain will determine whether the projected projectiles will have the desired effect.

It will be appreciated that holograms can store and reproduce more than three images and that apparent continuum of different reticles is possible to help a user to better understand what influence aiming decisions will have on the eventual distribution of projectiles. It will also be appreciated that the holograms can include images with one, two or more reticles in order to help a user to determine an aim point.

The reticle(s) provided in a holographic image may be shaped based upon on a model of expected paths taken by of or testing that reveals the actual paths taken by projectiles projected from a particular design of a particle projection device 20. The particle path 50 itself will depend on many factors, including but not limited to the fill factor in the particle projection device, the size of the projectiles, the shape of and energy imparted into the projectiles by accelerator 40, the wind resistance of the projectiles, the compressibility of the projectiles, the elasticity of the projectiles, the shape of the accelerator and the shape of the storage area from which the projectiles are projected. Additionally the force required to cause housing 20 to open, fracture, disintegrate or otherwise allow projectiles to exit from housing 20 will impact the particle projection path 50. Other factors may also influence the particle projection path 50 and therefore the designer's decisions about the shape of the particle projection path and tilt angle based changes thereto.

It will be appreciated from the foregoing, that reticle shapes illustrated here are exemplary only and not limiting.

Figure 9:
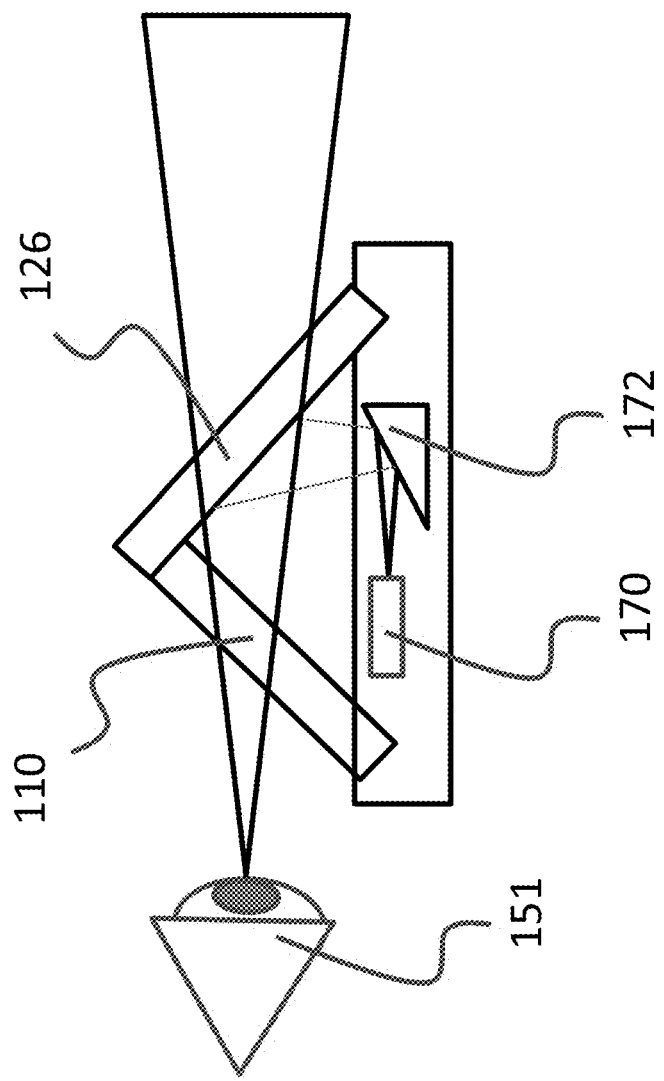
FIG. 9 illustrates another embodiment of an aiming system

FIG. 9 illustrates another type of hologram based aiming solution. In the embodiment that is illustrated in FIG. 9, an eye 151 of a user views a scene 120 through a window 110 and a hologram 126 with a fixed position. Hologram 126 is illuminated by a light source 170 which is reflected onto hologram 126 by an optional reflector 172. Light source 170 can take the form of one or more light emitting diodes, quantum dots, lasers, electroluminescent materials, OLED or any other type of light emitter capable of emitting light. During daytime operations, greater illumination may be necessary to overcome ambient light however, during night time operations it is preferred that little or no visible illumination of hologram 126 is used as it is only necessary that the holographic images are visible from a distance of 24" or less.

In other embodiments, illumination of hologram 126 is done in non-visible wavelengths that a user can observe only with the aid of wavelength specific sensing equipment. Examples of such wavelengths of light include but are not limited to infrared light in a wavelength greater than 2 microns or ultraviolet light. Where it is anticipated that such non-visible wavelengths are to be used hologram 126 will be adapted for use in such wavelengths.

In the embodiment illustrated in FIG. 9, hologram 126 can include different images with different reticles. These different images can be presented to the user by illuminating hologram 126 from different angles such as may be accomplished by allowing either the light source 170 itself or reflector 172 to mechanically pivot, or by changing the wavelength of light illuminating hologram 126. Alternatively, electronic approaches can be used such as selecting from more than one emitter in a light source 170 with each light source being positioned to illuminate hologram 126 from a different angle. Mode switching can be used in lasers to accomplish such results. Electronic tilt sensing can be accomplished using any known method for sensing tilt.

Figure 10B:
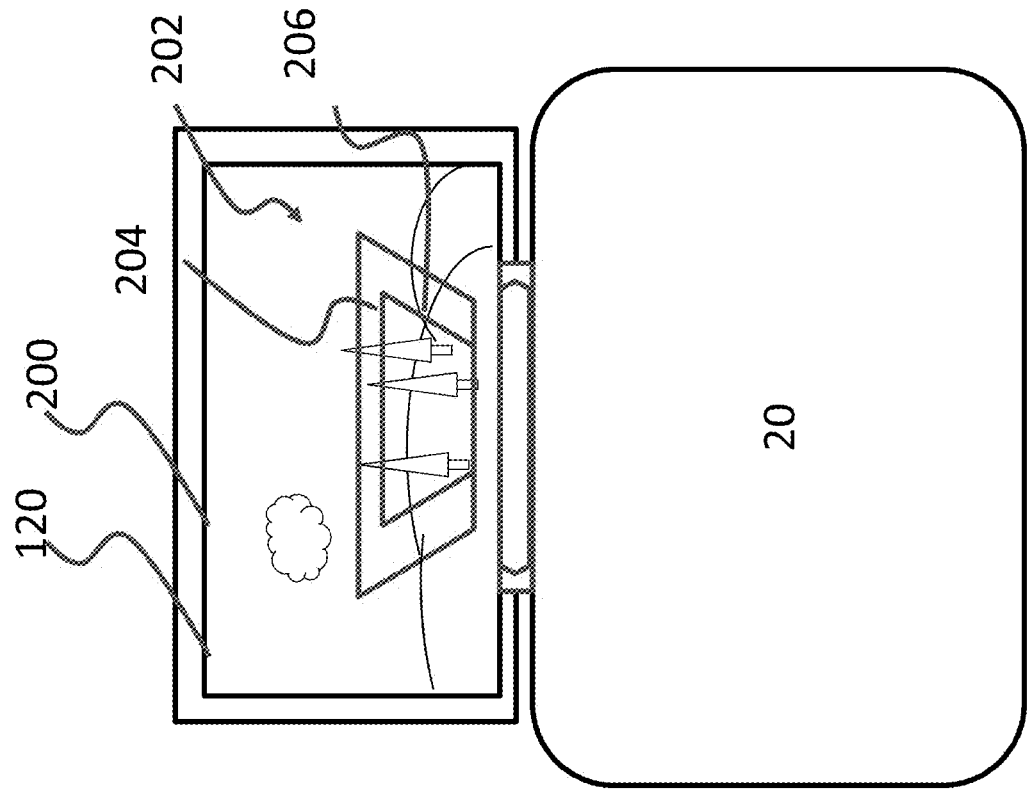
FIGS. 10A and 10B respectively show and rear views of the another embodiment of an aiming system and particle projection device.
Figure 10A:
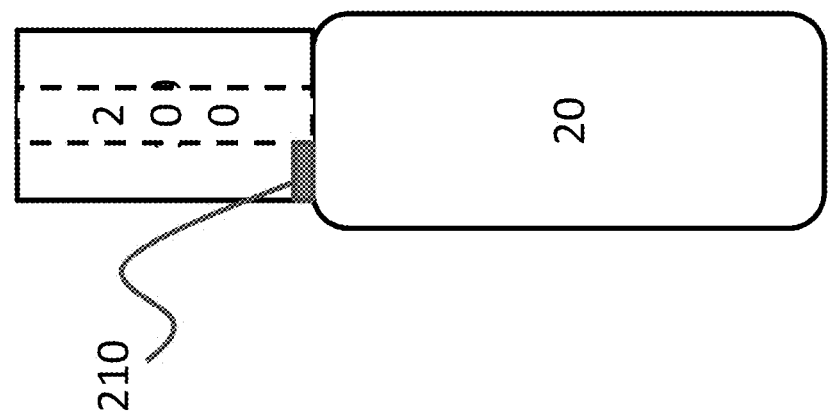

FIGS. 10A and 10B illustrate yet another embodiment of the invention, in this embodiment no hologram is used and aiming device 100 has a window 200 that is provided with at least one reticle image 202 having reticles 204 and 206 formed directly thereon or therein that can be visible with or without illumination such as light provided by a light source 210.

Reticle image 202 can comprise any form of patterned feature that can be provided in, on or proximate to window 200 that can be observed by person with the aid of sensors that can sense light beyond the range of human visual acuity, including but not limited to mid-infrared light such as that having a wavelength greater than about 2 microns, or ultraviolet light. Reticle image 202 can also comprise any form of patterned feature in, on or proximate to window 200 that can be observed by person. In one embodiment reticle image 202 comprises a pattern of etched, cut, or recessed areas in a clear substrate or a pattern of noticeably raised areas a surface. Reticle image 202 can include light emitting materials such as printable or patternable light emitting materials such as OLED, LED, quantum dot, or electroluminescent materials and can include materials that reemit light generated for example by light emitter 210 in wavelengths that are not visible in a form that is visible to the unaided human eye or the aided human eye. Materials that selectively and partially absorb light from the scene 120 including materials that provide static light absorbance as well as materials that provide dynamic light absorbance such as LCD and cholesteric materials can also be used to define reticles.

During daytime operations, greater illumination may be necessary to overcome ambient light however, during night time operations it is preferred that little or no visible illumination of window 200 is used as it is only necessary that any reticle images are visible from a distance of 24" or less.

It will be appreciated that here too reticle adjustment with tilt is possible. This can be done by sensing tilt in any known fashion and providing an automatic switching system, control circuit or processor that can cause a visual differentiation of one or more reticle patterns from an arrangement of more than one arrangement of different reticle patterns, using, for example, selective illumination or darkening of a different reticle pattern based on the extent of tilt and a potential impact of tilt on the particle projection path.

The embodiments of FIGS. 8, 9A and 9B can be mounted to or otherwise joined or provide with housing 22 of particle projection device 20 as is generally described above with respect to the embodiment of FIGS. 6A-6B.

It is to be understood that the above described embodiments are merely illustrative of numerous and varied other embodiments which may constitute applications of the principles of the invention. Such other embodiments may be readily devised by those skilled in the art without departing from the spirit or scope of this invention.

What is claimed is:

1. An aiming system for use with a particle projection device, the aiming system comprising:
   a housing mountable to the particle projection device for movement therewith;
   a window supported by the housing and defining a first field of view when the housing is at a first orientation and a second field of view when the housing is at a second orientation;
   wherein a first reticle image is visible in the window when the housing is at the first orientation with the first reticle image representative of a projection path of the particles in the first field of view; and
   wherein a second reticle image is visible in the window when the housing is at a second orientation with the second reticle image being representative of a projection path of the particles in the second field of view.

2. The aiming system of claim 1, wherein the window has a hologram movable relative to the housing and arranged to move so that the first reticle image is viewable in the field of view through the window when the housing and particle direction device are in a first orientation and to move so that the second reticle image is viewable in the field of view through the window when the housing and the particle projection device are in a second orientation.

3. The aiming system of claim 1, wherein the window has a hologram that may be illuminated from one of a first light source that causes the first reticle image to be visible in the window and a second light source that causes the second reticle image to be visible in the window and a decision is made between illuminating the first light source and illuminating the second light source based upon a sensed orientation.

4. The aiming system of claim 3 wherein the first light source is at a first position relative to the hologram and the second light source is at a second position relative to the hologram.

5. The aiming system of claim 1, wherein the window has a hologram illuminated by at least one of a pivoting light source or a reflector that are allowed to mechanically pivot with changes in orientation to mechanically pivot to change the orientation of illumination of the hologram and change the reticle between the first reticle and the second reticle.

6. The aiming system of claim 1, wherein the window has a hologram illuminated by a light source that can change wavelengths so that a reticle viewable in the window includes either the first reticle image or the second reticle image.

7. The aiming system of claim 1, wherein the window has a hologram in the window illuminated by a laser and a laser mode is switched between a first mode that illuminates the hologram to cause a first reticle pattern to appear in the window and a second mode that illuminates the hologram to cause a second reticle pattern to appear in the window.

8. The aiming system of claim 1, further comprising an electronic tilt sensor sensing an orientation of the aiming system and causing the first reticle image to be presented when a first orientation is sensed and causing the second reticle image to be presented when a second orientation is sensed.

9. The aiming system of claim 1, wherein at least one of the first reticle image and the second reticle image can be detected by sensors that sense non-visible wavelengths of light.

10. The aiming system of claim 1, wherein at least one of the first reticle image and the second reticle image takes the form of an arrangement of light emitting material.

11. The aiming system of claim 1, wherein at least one of the first reticle image and the second reticle image comprises a pattern of light absorbing materials.

12. The aiming system of claim 1, wherein at least one of the first reticle image and the second reticle image comprises an image formed on a liquid crystal display.

13. The aiming system of claim 12, wherein the housing is a housing of the particle projection device.

* * * * *